(12) United States Patent
Weisheng et al.

(10) Patent No.: US 9,977,557 B2
(45) Date of Patent: May 22, 2018

(54) FLEXIBLE TOUCH SENSOR AND DISPLAY DEVICE INCLUDING THE FLEXIBLE TOUCH SENSOR

(71) Applicant: EverDisplay Optronics (Shanghai) Limited, Shanghai (CN)

(72) Inventors: Su Weisheng, Shanghai (CN); Huang Tienwang, Shanghai (CN)

(73) Assignee: EVERDISPLAY OPTRONICS (SHANGHAI) LIMITED, Shanghai (CN)

(*) Notice: Subject to any disclaimer, the term of this patent is extended or adjusted under 35 U.S.C. 154(b) by 0 days. days.

(21) Appl. No.: 15/461,545

(22) Filed: Mar. 17, 2017

(65) Prior Publication Data

US 2017/0269735 A1 Sep. 21, 2017

(30) Foreign Application Priority Data

Mar. 18, 2016 (CN) .......................... 2016 1 0158331

(51) Int. Cl.
*G06F 3/044* (2006.01)
*G02F 1/1333* (2006.01)

(52) U.S. Cl.
CPC .......... *G06F 3/044* (2013.01); *G02F 1/13338* (2013.01); *G02F 2202/28* (2013.01); *G06F 2203/04102* (2013.01)

(58) Field of Classification Search
None
See application file for complete search history.

(56) References Cited

U.S. PATENT DOCUMENTS

| 8,289,232 | B2* | 10/2012 | Kobayashi | G09F 9/33 |
| | | | | 345/204 |
| 9,891,725 | B2* | 2/2018 | Lindblad | G06F 3/0362 |
| 2006/0007368 | A1* | 1/2006 | Slikkerveer | G09F 9/35 |
| | | | | 349/58 |
| 2013/0215035 | A1* | 8/2013 | Guard | G06F 3/0221 |
| | | | | 345/168 |
| 2014/0028584 | A1 | 1/2014 | Park et al. | |
| 2015/0128728 | A1* | 5/2015 | Salo | G01L 1/04 |
| | | | | 73/862.626 |
| 2015/0241925 | A1* | 8/2015 | Seo | G06F 1/1681 |
| | | | | 361/679.27 |

(Continued)

FOREIGN PATENT DOCUMENTS

CN 101424509 A 5/2009
CN 101467007 A 6/2009

*Primary Examiner* — Nicholas Lee
(74) *Attorney, Agent, or Firm* — Andrew F. Young, Esq.; Lackenbach Siegel, LLP

(57) ABSTRACT

This disclosure is related to the field of semiconductor technology, more specifically, to a flexible touch sensor and display device including the flexible touch sensor. The flexible touch sensor is formed through the construction of chain structure formed by flexible conductors and rigid conductors, that is, based on the principle of chains, connecting the rigid conductors and flexible conductors in an interval way, to form a chain structure, and making the manufactured sensor and the display device reach the purpose of being flexible, and the problem caused by the immature of the development of flexible materials that the flexible sensor can't be mass-produced can be effectively solved.

20 Claims, 3 Drawing Sheets

(56) References Cited

U.S. PATENT DOCUMENTS

| | | | |
|---|---|---|---|
| 2015/0378391 A1* | 12/2015 | Huitema | G06F 1/163 361/679.03 |
| 2016/0014919 A1* | 1/2016 | Huitema | G06F 1/1652 313/511 |
| 2016/0231843 A1* | 8/2016 | Kim | G06F 3/0412 |
| 2017/0061836 A1* | 3/2017 | Kim | G09F 9/301 |

* cited by examiner

FLEXIBLE TOUCH SENSOR AND DISPLAY DEVICE INCLUDING THE FLEXIBLE TOUCH SENSOR

CROSS-REFERENCE TO RELATED APPLICATIONS

The present application claims priority to and the benefit of Chinese Patent Application No. CN 201610158331.7, filed on Mar. 18, 2016, the entire content of which is incorporated herein by reference.

BACKGROUND OF THE INVENTION

Field of the Invention

The present patent application relates to the field of semiconductor technology, more specifically, to a flexible touch sensor and display device including the flexible touch sensor.

Description of the Related Art

With the development of touch sensor technology, the demand for flexible touch sensors becomes more and more urgent; during the research and development process of flexible touch sensors, flexible panel has become a major choke point of the present field.

Currently, the touch panel structure can be divided into two touch, such as capacitance, structures: DITO (Double sides ITO, coating ITO film on two surfaces of glass substrate) and SITO (Single ITO, coating two layers of ITO film on the upper surface of glass substrate), but the materials used thereof are mainly ITO (Indium-Tin Oxide) material; however, since the flexible performance of ITO material is poor, the touch panels prepared by ITO material do not have a good flexible performance.

To make the panels prepared have a certain flexible performance (i.e. flexibility) in the industry, materials with a certain flexible performance such as silver nanowires and graphene etc. are generally used to replace ITO material, however, since the development of cross-correlation technique is lagging behind, the touch panels prepared by flexible materials cannot be produced, and cannot meet the demand of existing market for flexible components.

SUMMARY OF THE INVENTION

In view of the problems above, the present patent application provides a flexible touch sensor, the sensor comprises a plurality of layers of chain structures, and each of the chain structures comprise:
  a plurality of rigid conductors and a plurality of flexible conductors;
  wherein, the plurality of rigid conductors and the plurality of flexible conductors are electrically interconnected and arranged in an interval way.

In the above mentioned flexible touch sensor, the rigid conductor is made of Indium-Tin Oxide.

In the above mentioned flexible touch sensor, the flexible conductors are made of nanometer silver, grapheme, or organic conductor.

In the above mentioned flexible touch sensor, the sensor further comprises:
  an insulating layer, located between two adjacent layers of the chain structures.

In the flexible touch sensor as disclosed above, the structures between each two layers of the chain structures are same.

In the flexible touch sensor as disclosed above, each of the layers of the chain structures has a length less than 100 µm.

In the flexible touch sensor as disclosed above, the sensor further comprises:
  a glass substrate; the plurality of layers of chain structures are arranged on the one side of the glass substrate, or wherein, the plurality of layers of chain structures are arranged on both sides of the glass substrate.

In the flexible touch sensor as disclosed above, the sensor further comprises an overlay structure;
  the plurality of layers of chain structures are arranged on the one side of the glass substrate, and the plurality of layers of chain structures are located between the glass substrate and the overlay structure; or
  the plurality of layers of chain structures are arranged on both sides of the glass substrate, and the plurality of layers of chain structures comprise a top chain structure on one side of the glass substrate and a bottom chain structure on the other side of the glass substrate, and the top chain structure is located between the glass substrate and the overlay structure.

Wherein, the top chain structure comprises at least one of the layers of the chain structures, and the bottom chain structure comprises at least one layer of the chain structure.

In the flexible touch sensor as disclosed above, the overlay structure is made of organic flexible material.

In the flexible touch sensor as disclosed above, the chain structure and the covered structure are aligned to at least one border.

The present patent application also provides a flexible display device; the flexible display device includes the flexible touch type sensor, which is mentioned in any item above.

The advantages and positive effects can be achieved as follows;

Based on the principle of chains, the chain structure is formed through the interlaced connection of the rigid conductors and flexible conductors, and the flexible touch sensor is formed based on replacing the ITO layer in traditional touch sensors by the chain structure, so that the sensors and display devices manufactured can achieve the purpose of being flexibility, and effectively solve the problem that the flexible sensors cannot be produced, which is resulted by the immature development of flexible materials.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
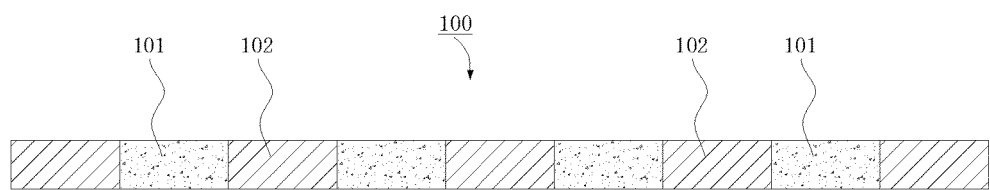
FIG. 1 shows a diagram of the flexible chain structure of embodiments of the present patent application.

The present invention will now be described more fully hereinafter with Referring to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with Referring to the accompanying drawings.

EMBODIMENTS

Referring to the structure of FIG. 1, the flexible touch sensor of the present application may comprise a plurality of layers of chain structures 100; the chain structure may be formed by alternate and mutually interlaced arrangement of flexible conductors 101 and rigid conductors 102, i.e. it can be electrically interconnected and arranged in an interval way; for instance, in one chain structure 100, a rigid conductor 102 can be arranged between two adjacent flexible conductors 101, also a flexible conductor 101 is arranged between two adjacent rigid conductor 102; and the structures of the two ends of the chain structure may be both rigid conductors 102, also may be both flexible conductors 101, also may be a rigid conductor 102 at one end and a flexible conductor 101 at the other end; the specific type of the conductors arranged at the ends of the chain structure can be determined based on the actual demand.

Figure 2:
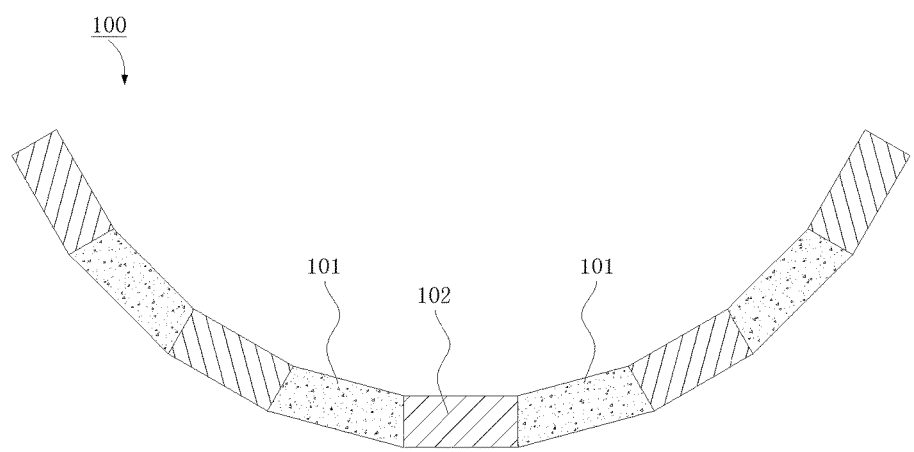
FIG. 2 shows a diagram of flexibility effects of the flexible chain structure of embodiments of the present patent application.

Referring to the structure of FIG. 2, since the flexible conductor 101 is included in the chain structure, such that the chain structure 100 can bend in a certain degree under stress, and the stress can be concentrated on the flexible conductor 101 when bending, so as to ensure to achieve a bending effect of the chain structure in a desired level according to a certain axial direction, to meet the practical demand of bending sensor to a certain degree, so that the structure has a better flexibility relative to traditional sensor structure.

As a preferred embodiment of the present patent application, the rigid conductor 102 above can be made of ITO (Indium-Tin Oxide), and the flexible conductor 101 can be made of flexible conductive material (Conductor) like nanometer sliver, grapheme, or organic conductors; moreover, the organic conductors above may be made of, for example, aqueous solution of high molecular polymer, such as PEDOT: PSS mixture, etc.

Further, the geometry of the flexible conductor 101 and rigid conductor 102 in one chain structure 100 can be the same or different, and the geometry of different flexible conductor 101 and different rigid conductor 102 can be the same or different, as long as it can meet the demand for flexibility; and to make the chain structure 100 has better flexibility, the flexible conductor 101 and rigid conductor 102 in one chain structure 100 can be formed in the same geometry. Along the extending direction of the length of the chain structure 100, each flexible conductor 101 has a length which can be controlled within a certain length range, and each rigid conductor 102 has a length which can be controlled within a certain length range; for example, each flexible conductor 101 has a length which can be formed below 200 m, preferably below 100 m, and each rigid conductor 102 has a length which can be formed below 200 m, preferably below 100 m; and to avoid the chain structure being too long in length which may easily result fracture of the chain structure 100, and the chain structure being too short in length which may cause the defects like increasing the operation capacity of the sensors, each flexible conductor 101 has a length which can be controlled within 50 μm to 200 μm (for example 50 μm, 80 μm, 100 μm, 150 μm, 200 μm), preferably, can be controlled within the length range of 50 μm to 100 μm, and rigid conductor 102 has a length which can be controlled within 50 μm to 200 μm (for example 50 μm, 80 μm, 100 μm, 150 μm, 200 μm), preferably, can be controlled within the length range of 50 μm to 100 μm.

Figure 3:
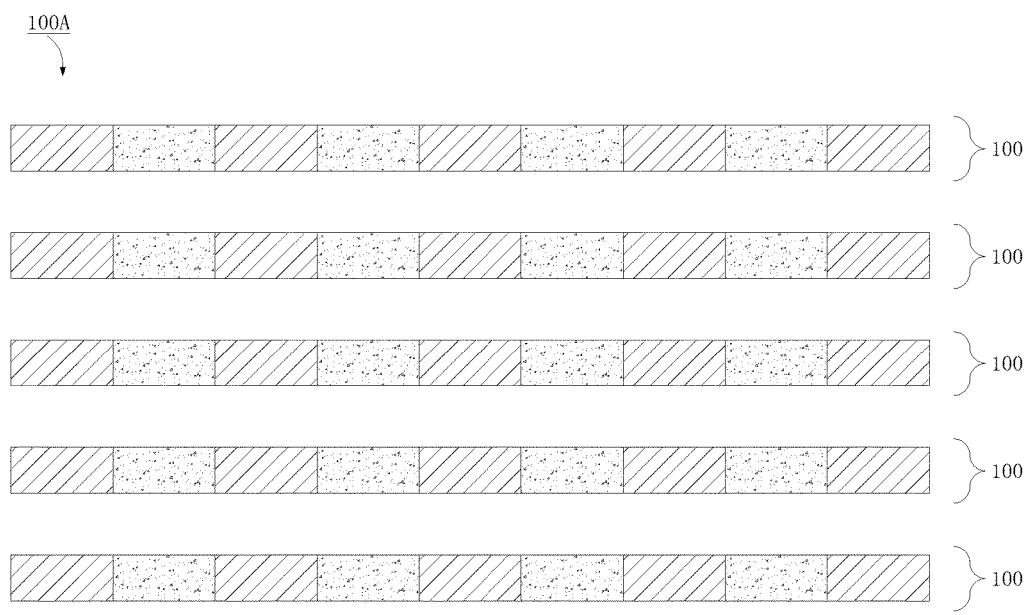
FIG. 3 shows a structure diagram of the flexible sensor formed by the plurality of layers of chain structure of embodiments of the present patent application.

Referring to the structure of FIG. 3, the flexible touch sensors may be formed by multiple-layer structure 100A; notably, the different chain structures 100 can be entirely same in structure, so that the flexible touch sensors can have better flexibility, and different chain structures 100 of the multiple-layer structure 100A are aligned to at least one border; for instance, as shown in FIG. 3, the flexible touch sensor comprises a multiple-layer structure 100A, in which the plurality layers of chain structures are arranged parallel to each other, and along the extending direction of the length of chain structure 100 of the vertical multiple-layer structure 100A, the left borders (in view of FIG. 3) of each two layers of chain structures 100 are on the same line, or the right border (in view of FIG. 3) of the each two layers of chain structures 100 are on the same line, or the left border and right border (in view of FIG. 3) of any two layers of chain structure 100 are on the same line (as shown in FIG. 3).

Figure 4:
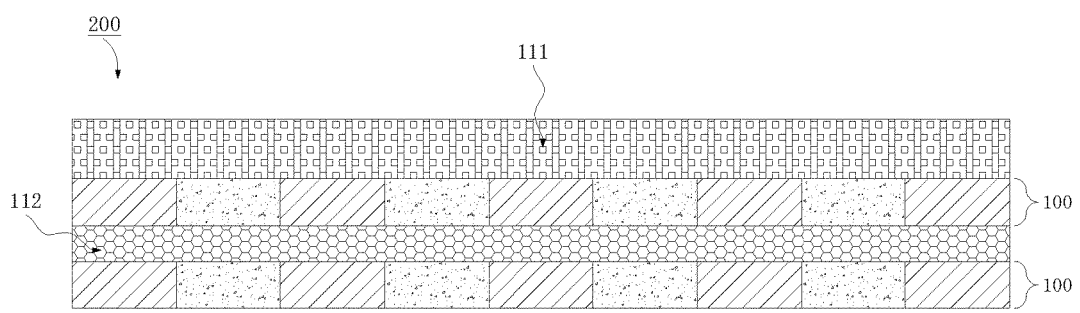
FIG. 4 shows a structure diagram of the flexible sensors of a preferred embodiment of the present patent application.

Referring to the structure of FIG. 4, FIG. 4 is a structure diagram of the flexible touch sensor 200 of a preferred embodiment of the present patent application; as shown in FIG. 4, an insulating layer 112 can be arranged between two adjacent layers of chain structures 100 of the multiple-layer structure 100A forming the flexible touch sensor 200, so that electric conduction of adjacent chain structures can be avoided; and a covered structure 111 is arranged above the chain structure 100 located on the top layer to protect the flexible sensor; wherein the covered structure 111 is generally cover lens, such as tempered glass with user protection, and so on. Preferably, the covered structure 111 above may be made of flexible organic material, such as polyethylene terephthalate (PET), polycarbonate (PC), and so on.

Further, the flexible touch sensor of the present application may also include a glass substrate and the covered structure, and according to different kinds of sensors, the multiple-layer structure above can be arranged on the one side of the glass substrate, or on both sides of the glass substrate (glass), it will be respectively explained according to the illustrations as follow:

It is necessary to explain that only the condition of two layers of chain structures is illustrated below for easy explanations, and the skilled person in the art should know that any of the layer of chain structure can be replaced by at least two layers of chain structures arranged adjacently in the following embodiments; additionally, the insulating layers should be arranged between each adjacent chain structures to ensure that each layer of chain structure can work properly and not cause adverse effects to the chain structure adjacent thereto.

Figure 5:
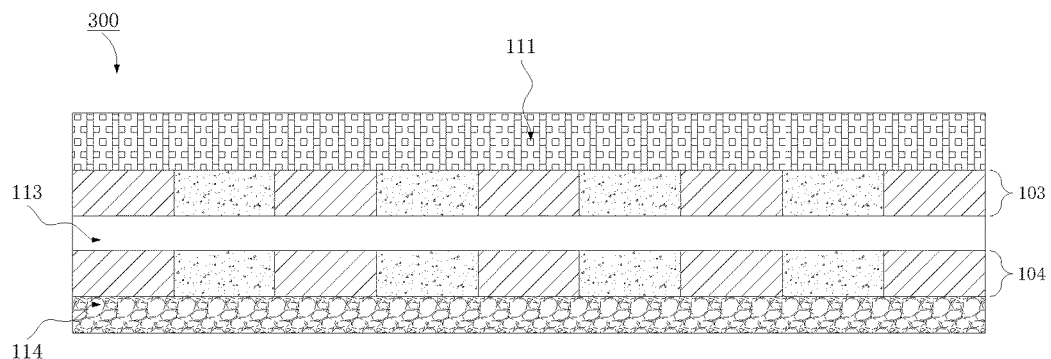
FIG. 5 shows a structure diagram of the touch panel of DITO type of a preferred embodiment of the present patent application.

FIG. 5 shows the touch panels (TP) 300 with touch structure such as DITO touch structure, and the touch panel 300 may comprise the covered structure 111, such as cover lens, top chain structure 103, glass substrate 113, bottom chain structure 104, and liquid crystal display 114, and the top chain structure 103 and bottom chain structure 104 are located on the two opposite sides of the glass substrate, and the covered structure 111 is arranged on the other side of the top chain structure 103 opposite to the glass substrate 113, and the liquid crystal display 114 is arranged on the other side of the bottom chain structure opposite to the glass substrate 113, i.e. the DITO touch panel structure 300 of present embodiment comprises the covered structure 111, the top chain structure 103, the glass substrate 113, the bottom chain structure 104, and the liquid crystal display 114 formed in the order from top to bottom.

Preferably, optical clear adhesive (OCA) can be provided between the covered structure 111 and the top chain structure 103, so that the covered structure 111 can be fit with the top chain structure 103; similarly, optical clear adhesive can also be provided between the bottom chain structure 104 and the liquid crystal display 114, so that the bottom chain structure 104 can be fit with the liquid crystal display 114.

Figure 6:
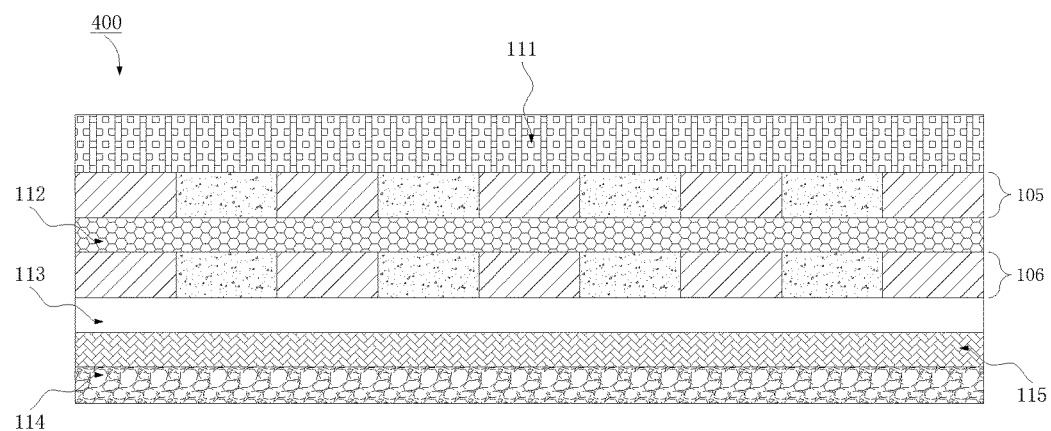
FIG. 6 shows a structure diagram of the touch panel of SITO type of a preferred embodiment of the present patent application.

FIG. 6 shows the touch panel 400 with SITO touch structure, and the touch panel 400 may comprise the covered structure 111, such as cover lens etc., the first chain structure 105, the insulating layer 112, the second chain structure 106, the glass substrate 113, the shielding layer (shielding ITO) 115, and the liquid crystal display 114 overlaid in the order from top to bottom in turn; similarly, the covered structure 111 can be fit closely with the first chain structure 105 through optical adhesive layer.

Preferably, optical clear adhesive (OCA) can be provided between the covered structure 111 and the top chain structure 103, so that the covered structure 111 can be fit closely with the top chain structure 103; similarly, the optical clear adhesive can also be provided between the bottom chain structure 104 and the liquid crystal display 114, so that the bottom chain structure 104 can be fit with the liquid crystal display 114.

It should be noticed that the chain structures shown in FIG. 5 and FIG. 6 can both be formed by the alternate and mutually interlaced arrangement of the flexible conductor 101 and the rigid conductor 102, and in the same touch structure, the structures between each two layers of the chain structures are same, and since various composing condition of the chain structure is explained above, it is not described herein.

In conclusion, a chain structure is formed through the interlaced connection of the rigid conductors and flexible conductors in the embodiments of the present patent application, and a sensor and a touch panel with flexible performance is manufactured the chain structure, so as to solve the problem that the flexible sensors cannot be produced, which is resulted by the immature development of flexible materials.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. A flexible touch sensor, comprising a plurality of layers of chain structures, each of the chain structures comprising:
   a plurality of rigid conductors and a plurality of flexible conductors;
   wherein the plurality of rigid conductors and the plurality of flexible conductors are electrically interconnected and arranged in an interlaced way.

2. The flexible touch sensor of claim 1, wherein the rigid conductor is made of Indium-Tin Oxide.

3. The flexible touch sensor of claim 2, wherein the flexible conductors are made of nanometer sliver, graphene or organic conductor.

4. The flexible touch sensor of claim 1, wherein the sensor further comprises:
   an insulating layer located between two adjacent layers of the chain structures.

5. The flexible touch sensor of claim 1, wherein the structures between each two layers of the chain structures are same.

6. The flexible touch sensor of claim 1, wherein each of the layers of the chain structures has a length less than 100 μm.

7. The flexible touch sensor of claim 1, further comprising:
   a glass substrate;
   wherein the plurality of layers of chain structures are arranged on one side of the glass substrate, or
   the plurality of layers of chain structures are arranged on both sides of the glass substrate.

8. The flexible touch sensor of claim 7, further comprising:
   a covered structure;
   wherein the plurality of layers of chain structures are arranged on one side of the glass substrate, and the plurality of layers of chain structures are located between the glass substrate and the covered structure; or
   the plurality of layers of chain structures are arranged on both sides of the glass substrate, the plurality of layers of chain structures comprise a top chain structure on one side of the glass substrate and a bottom chain structure on the other side of the glass substrate, and the top chain structure is located between the glass substrate and the covered structure;

the top chain structure comprises at least one of the layers of the chain structures, and the bottom chain structure comprises at least one of the layers of the chain structures.

9. The flexible touch sensor of claim 8, wherein the covered structure is made of organic flexible material.

10. The flexible touch sensor of claim 8, wherein the chain structures and the covered structure are aligned to at least one border.

11. A flexible display device, comprising a flexible touch sensor, the flexible touch sensor comprising a plurality of layers of chain structures, each of the chain structures comprising:

a plurality of rigid conductors and a plurality of flexible conductors, the plurality of rigid conductors and the plurality of flexible conductors are electrically interconnected and arranged in an interlaced way.

12. The flexible display device of claim 11, wherein the rigid conductor is made of Indium-Tin Oxide.

13. The flexible display device of claim 12, wherein the flexible conductors are made of nanometer sliver, graphene or organic conductor.

14. The flexible display device of claim 11, wherein the sensor further comprises:

an insulating layer located between two adjacent layers of the chain structures.

15. The flexible display device of claim 11, wherein the structures between each two layers of the chain structures are same.

16. The flexible display device of claim 11, wherein each of the layers of the chain structures has a length less than 100 μm.

17. The flexible display device of claim 11, further comprising:

a glass substrate;

wherein the plurality of layers of chain structures are arranged on one side of the glass substrate, or the plurality of layers of chain structures are arranged on both sides of the glass substrate.

18. The flexible display device of claim 17, further comprising:

a covered structure;

wherein the plurality of layers of chain structures are arranged on one side of the glass substrate, and the plurality of layers of chain structures are located between the glass substrate and the covered structure; or the plurality of layers of chain structures are arranged on both sides of the glass substrate, the plurality of layers of chain structures comprise a top chain structure on one side of the glass substrate and a bottom chain structure on the other side of the glass substrate, and the top chain structure is located between the glass substrate and the covered structure;

the top chain structure comprises at least one of the layers of the chain structures, and the bottom chain structure comprises at least one of the layers of the chain structures.

19. The flexible display device of claim 18, wherein the covered structure is made of organic flexible material.

20. The flexible display device of claim 18, wherein the chain structures and the covered structure are aligned to at least one border.

* * * * *